3,107,153
METHOD OF FABRICATING CARBON AND
GRAPHITE STRUCTURES
Carl W. Boquist, Chicago, Ill., assignor to Armour Research Foundation of Illinois Institute of Technology, Chicago, Ill., a not-for-profit corporation of Illinois
No Drawing. Filed Sept. 23, 1960, Ser. No. 57,883
10 Claims. (Cl. 23—209.4)

The present invention relates to an improved method of making carbon and graphite products and more particularly relates to the use of synthetic carbon-producing binders in making carbon and graphite bodies and the products resulting therefrom.

In the conventional graphite manufacturing process, a carbon-containing material such as petroleum coke is mixed with a thermoplastic binder such as coal tar pitch to bond the carbon particles together. The mixture is then molded, supported, and heated to remove the non-carbon materials, i.e., carbonization. This carbonization phase is extremely critical in the production of graphite bodies since volatile gases tend to become entrapped in the molded body and expand as the temperature is increased to cause rupturing or bloating of the bodies. To overcome this problem the usual procedure has been to heat at an extremely slow rate. After cooling, the resultant carbon bodies are reheated to crystallize the carbon into graphite, i.e., graphitization. Even with this time-consuming and somewhat delicate procedure there result large amounts of waste due to lack of reproducibility and a rather low practical limit on the achievable physical properties (density, strength) of the end product.

In order to have a highly pure carbon body where thermoplastic binders are employed, subsequent purification is necessary. However, in the two step heating cycle noted above, the process is cumbersome and slow due to the softening of the binder at elevated temperatures. That is to say, support of the body is essential during heating and subsequent cooling. The prior art has attempted to overcome this problem by using a mixture of a thermoplastic composition with one of thermosetting properties. In this way, although the binder always behaves thermoplastically, the thermosetting composition does provide some structural support at elevated temperatures. While this expedient reduces the fabrication time, it nevertheless remains lengthy.

In contradistinction to the teachings and practices of the prior art I have provided a process which obviates the attendant disadvantages of the known processes by further materially reducing heating time, but still providing carbon and/or graphite bodies of high purity and good physical properties, which process represents a considerable improvement over the prior art.

Briefly stated, the instant invention encompasses the use of a synthetic resin binder which will itself form carbon with a carbonaceous material to fabricate a solid carbon body. The carbon products resulting from this technique have improved physical properties and the fabrication time, pound for pound, is greatly reduced. My invention contemplates the addition of coal tar pitch or other thermoplastic carbonaceous material to the synthetic binder to modify the brittle nature of the thermosetting binder, thus providing for easier expulsion of evolved gases and promotion of shrinkage during rapid fabrication. In connection with the beneficial effects of inducing uniform shrinkage during fabrication, the mixing of small amounts of thermal carbon with petroleum coke performs this function to a marked extent.

While emphasis has been made upon the manufacture of graphite, it is to be understood that this process is equally applicable in the manufacture of carbon. For purposes of consistency and clearness of understanding carbon will be referred to hereinafter as meaning both carbon and graphite.

It is accordingly a primary object of my invention to provide an improved method for producing solid multi-crystalline graphite bodies.

Another object of this invention is to provide a method whereby the rate of carbonization in producing carbon bodies is greatly increased.

Still another object of this invention is to provide a method of producing dense carbon bodies by increasing the speed of production and the reproducibility of the physical properties whereby the production efficiency is increased.

Yet another more specific object of this invention is to provide an unusually high purity carbon product wherein the plasticizer or binder material consists substantially of a thermosetting resin having a high carbon residue.

Yet another more specific object of this invention is to provide an improved graphite making process wherein the starting material is a fine particle carbon aggregate in combination with a binder consisting essentially of a prepolymerized furfuryl alcohol.

These and other objects, features and advantages of my invention will become apparent to those skilled in this particular art from the description to follow.

It is known that the highest strength-to-density ratios in carbon bodies is achieved where the starting material is of a fine particle size. Along these lines, the particle size and distribution of the finest commercially available calcined petroleum coke known as coke flour was used. This flour is commercially available, for example, Texas Lockport No. 90. This flour consists of 90% of —200 mesh coke particles, remainder larger particles. While the smallest of particles is desirable for carbon articles requiring high structural strength, the process is by no means limited thereto. That is to say, larger sized coke particles can be used where less strength may be tolerated.

The two basic binder ingredients employed in this process are coal tar pitch and prepolymerized furfuryl alcohol. Both ingredients are especially well suited to the invention because of their high coke residue values. However, other thermoplastic resins having good coke residue values may be substituted for the coal tar pitch; for example, petroleum pitches. The binder has about 60% residue in the mix with slow carbonizing and a coke density on the order of 1.95 grams per cubic centimeter.

Prepolymerization of the furfuryl alcohol (hereinafter referred to as FA) reduces the water content thereof and thereby reduces the possibility of rupture during heating. To this end, the FA polymer disclosed and described in U.S. Patent No. 2,681,896 was found to be particularly suitable to the process and for a better understanding thereof the reader's attention is directed thereto. Briefly stated, however, this FA polymer affords considerable versatility because the degree of its polymerization can be selected with a fair amount of accuracy. It should be mentioned here that the degree of polymerization of the FA is variable and will be fixed by the requirements of the process and end product, as will occur to those skilled in this particular art. That is, the greater the degree of polymerization the greater the density and amount of coke residue. The range of viscosities of the polymers used was from 200 to 9800 centipoises at 25° C.

This invention may be best envisioned by reference to Table I following, wherein, different compositions are listed with all parts and percentages by weight.

Table I

| Raw material formulation | Green density g./cm.³ | Green specimen length in. | Carbonized specimen length at 1,000° C. | Graphitized specimen length at 2,850° C. | Graphitized density g./cm.³ |
|---|---|---|---|---|---|
| 100 coke, 20 FA polymer | 1.73 | 4.39 | 4.36 | 4.30 | 1.70 |
| 90 coke, 10 thermatomic carbon 20 FA polymer | 1.75 | 4.39 | 4.35 | 4.27 | 1.74 |
| 90 coke, 10 thermatomic carbon, 18 FA polymer 4 pitch | 1.71 | 4.39 | 4.35 | 4.27 | 1.71 |
| 100 coke, 14 FA polymer, 14 pitch | 1.54 | 4.42 | (¹) | 4.29 | 1.59 |

¹ This specimen was brought directly to graphitization at 2,800° C. in 45 minutes.

In all of the above compositions the parts were weighed out. The FA polymer was reactivated with from 1% to 3% paratoluene sulfonic acid. The sulfonic acid had been dissolved in absolute methyl alcohol as a 50% solution. Where thermatomic carbon was also used the coke and carbon were weighed and then intimately dry mixed. The binder and coke flour were then mixed together for at least 15 minutes. After this preliminary mixing period, a portion sufficient to make the desired sample size (up to 1⅛ x 1⅛ x 4 inches) was again mixed until the mix appeared substantially completely homogeneous. The mix was then placed in a heated die (125° C.) and pressed at from 10,000 to 15,000 p.s.i. for 15 minutes. At the end of this period, polymerization had proceeded far enough so that the body is self-supporting. Hot extrusion can replace the heat and pressure process, however, where the starting material is binder rich.

The green specimens were next placed, unsupported, in a graphite resistor tube furnace and slowly fired to a dull red heat in a period of from one to eight hours. At this point the heating rate was sharply increased to achieve a temperature in excess of 2800° C. over a period of about one hour and the specimen then cooled as rapidly as possible. This cooling time was approximately four hours where the specimen remained in the furnace.

Other specimens prepared in the same manner were heated in excess of 2650° C. in less than two hours with no visible cracking of the body. Preliminary tests indicated flexural strengths in excess of 2000 p.s.i. for densities of about 1.7 g./cc. Other physical characteristics compare quite favorably with those of commercial fine-grained electrode stock.

The binder must be of a thermosetting nature and along these lines the lower limit was a combination of 50% FA polymer and 50% coal tar pitch which demonstrated a remarkable ability to carbonize rapidly (one hour or less) with little tendency toward bloating or cracking. Subsequent batches using less and less pitch in solution showed similar behavior, until the pitch was eliminated entirely and still carbonization at relatively high green densities (1.73 grams per cubic centimeter) was achieved in a period of one hour. The amount of pitch added to the system controls the temperature at which the binder hardens and the amount of shrinkage. In this way, the binder may be kept in a rubbery air permeable state thereby permitting escape of volatiles during the carbonization cycle. On the other hand, the pitch introduces impurities to the composition and the amount used in the binder will therefore vary according to the particular application called for.

Forming specimens (either by hot molding as herein described or by hot extrusion) with a liquid FA polymer offers several distinct advantages over the traditional pitch-bonded systems even for such carbon-bonded bodies as silicon carbide, alumina, and fire clays. Requiring approximately half as much binder for equivalent green densities, the weight loss on carbonization is appreciably lowered, resulting in a higher carbonized density. Since the binder is thermosetting and rigid, no bloat can occur and the shrinkage on carbonization is remarkably uniform. While thermosetting binders are historically difficult to graphitize, this does not seem to be a serious obstacle with the FA polymer. Shrinkage on graphitization is sufficient to compensate for the loss of volatiles on carbonizing, resulting in a graphitized density as high or higher as that of the green body (1.70–1.80 grams per cubic centimeter). The binder being a synthetic resin, can be exactly reproduced and of high purity. Mixing a cold liquid with a cold aggregate can be done with a variety of mixing equipment with a high degree of uniformity of the batch, and a high degree of reproducibility between batches. It seems that with a given raw material formulation, green and graphitized properties can be predicted with an accuracy heretofore not possible. Furthermore, the thermosetting binder minimizes migration thereof during carbonization, leading to enhanced control and uniformity.

There are at least two means available to promote higher shrinkage in graphitizing. One is by adding small quantities of pitch in solution with the FA polymer, and the second is to add a thermatomic carbon (thermal carbon) to the mix. Thermatomic carbon is a carbon, commercially available, having a sub-micron particle size. The addition of pitch lowers the green density somewhat, but the higher shrinkage on graphitization compensates for the lower initial density. The addition of thermatomic carbon increases the green molded density, and promotes almost as much shrinkage as the pitch addition with the result that the graphitized density is higher than with a pitch addition. The mechanism controlling this shrinkage is thought to be one of lubrication by the spherical thermatomic carbon and the thermatomic-like insolubles in the case of pitch. Since thermatomic carbon particles are small, spherical and dense, they tend to interpack among the coke particles in a regular and reproducible way. There is, however, a relatively critical proportion of about 13.8% in a No. 90 coke-thermatomic carbon mixture at which interpacking is so complete that the structure becomes nearly impermeable to venting. Preferably thermatomic carbon should be kept below or above this proportion whereby good results are obtained. Where this carbon is an ingredient in this process, however, care must be taken to achieve high density to avoid decreases in resistance to thermal and mechanical shock.

The baking time involved in the above examples is about 1 hour as compared to standard times of about 55—200 hours.

Of course many modifications will occur without departing from the novel concepts of this invention.

I claim:

1. In a process of making graphite bodies, comprising the steps of: blending substantially homogeneously a mixture of carbon aggregate and a smaller amount of thermatomic carbon with a binder consisting essentially of from 50% to less than 100% prepolymerized furfuryl alcohol, balance pitch; forming the body by the application of heat and pressure; and hardening and graphitizing said body by baking, characterized by the fact that the body is without external physical support during baking.

2. A binder material for use in combination with carbon particles for the manufacture of solid carbon bodies, comprising: a mixture of from 50% to less than 100% prepolymerized furfuryl alcohol, balance pitch.

3. The method of making a solid carbon body which comprises the steps of: forming a binder material by intermixing and blending from 50% to less than 100% pre-polymerized furfuryl alcohol, balance pitch; mixing said binder with graphite; forming said binder-graphite mixture into a solid body; hot pressing said body, and further heating said body to complete the hardening thereof.

4. The method of making a solid carbon body which comprises the steps of: forming a first mixture consisting essentially of 100 parts finely ground coke, and 20 parts pre-polymerized furfuryl alcohol; mixing said first mixture with graphite; forming said first mixture-graphite mixture into a solid body; hot pressing said body, and further heating said body to complete the hardening thereof.

5. The method of claim 4 wherein said first mixture consists essentially of 90 parts coke, 10 parts thermoatomic carbon and 20 parts pre-polymerized furfuryl alcohol.

6. The method of claim 4 wherein said first mixture consists essentially of 90 parts coke, 10 parts thermal carbon, 18 parts polymerized furfuryl alcohol and 4 parts pitch.

7. The method of claim 4 wherein said first mixture consists of 100 parts coke, 14 parts pre-polymerized furfuryl alcohol, balance pitch.

8. The process of making a solid carbon body comprising the steps of: blending substantially homogeneously a mixture of particulate carbon and a lesser amount of thermatomic carbon with a binder material consisting essentially of from 50% to less than 100% prepolymerized furfuryl alcohol, balance pitch; forming said carbon body by the application thereto of heat and pressure, and hardening said body by the further heating thereof.

9. The method of making a solid carbon body which comprises the steps of: forming a binder material by intermixing and blending from 50% to less than 100% prepolymerized furfuryl alcohol, balance pitch; and mixing said binder with particulate carbon; forming said binder-carbon mixture into a solid body; hot pressing said body, and further heating said body to complete the hardening thereof.

10. A binder material consisting essentially of a mixture of from 50% to less than 100% prepolymerized furfuryl alcohol, balance pitch.

References Cited in the file of this patent

UNITED STATES PATENTS

| | | |
|---|---|---|
| 2,681,896 | Nielsen | June 22, 1954 |
| 2,761,848 | Bushong et al. | Sept. 4, 1956 |
| 2,884,391 | Winter et al. | Apr. 28, 1959 |